MAGNETIC RECORDING AND REPRODUCING SYSTEM

Filed Jan. 15, 1963

INVENTOR.
MASAHIKO FUKAMACHI
BY Hopgood & Calimafde
ATTORNEYS.

United States Patent Office 3,287,505

Patented Nov. 22, 1966

3,287,505

MAGNETIC RECORDING AND REPRODUCING SYSTEM

Masahiko Fukamachi, Tokyo, Japan, assignor to Nippon Electric Company, Limited, Tokyo, Japan, a corporation of Japan Filed Jan. 15, 1963, Ser. No. 251,622
4 Claims. (Cl. 179—100.2)

This invention relates to magnetic recording and reproducing systems and more particularly to such systems in which phase modulation is employed.

Conventional magnetic recording systems usually employ frequency modulation and demodulation or pulse width modulation and demodulation techniques for recording and reproducing various data involving low frequency signals containing D.C. components. One of the advantages of the frequency modulation method is that recording and reproduction of a comparatively wide frequency range of signals can be achieved at relatively low speeds of the tape or other magnetic recording medium since recording and reproduction of pulse wave forms is unnecessary. The method, however, does have the disadvantage that it is difficult to maintain the center frequency constant. It also has the further disadvantage that an undesirable output signal component is invariably generated with the reproduced signal, which is caused by variations in the tape speed encountered between the recording and reproducing steps.

The pulse width modulation method is advantageous in that the repetition frequency can be held constant with little or no difficulty. Furthermore, such an unwanted or undesirable output signal component as is produced with the frequency modulation method is, if produced at all, smaller than that produced with the frequency modulation method. This is because the ratio of the mark interval to the space interval of the pulse wave form produced during reproduction can be maintained substantially constant, particularly for lower frequency components, even if the frequency components caused by variations in the speed of the magnetic recording medium is within the frequency band necessary for recording and reproduction. The pulse width method, however, has the disadvantage of a relatively narrow frequency range because recording and reproduction by pulse wave forms is necessary.

The pulse code modulation is a still further method which is sometimes employed. This method has some application for special purposes, but it requires rather complex circuitry. Additionally, the useful frequency range for this method is comparatively narrow and accordingly its field of application is rather limited.

Accordingly, it is an object of this invention to provide a novel recording system for recording and reproducing electrical signals which utilizes phase modulation techniques and which substantially eliminates the above limitations.

Figure 1:
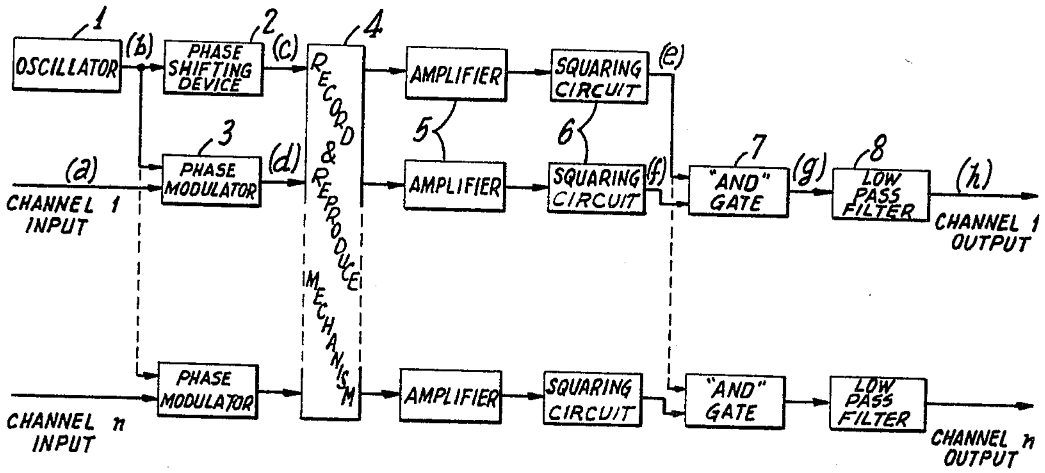

All of the objects, features and advantages of this invention and the manner of attaining them will become more apparent and the invention itself will be best understood by reference to the following description of an embodiment of the invention taken in conjunction with the accompanying drawing, in which:

FIG. 1 shows a block diagram of an embodiment of the invention, and

Figure 2:
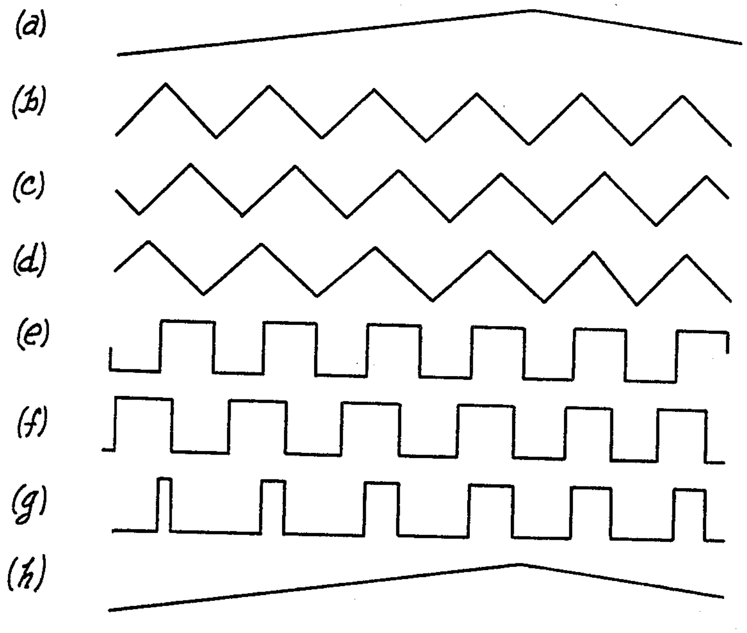

FIG. 2 graphically illustrates various voltage and current wave forms at different points on the block diagram of FIG. 1.

Referring now to FIG. 1, the numeral 1 denotes a constant frequency oscillator, 2 a phase shifting device, 3 a phase modulator, 4 a multitrack magnetic recording and reproducing mechanism, 5 an amplifier, 6 a squaring circuit, 7 an "AND" gate circuit, and 8 indicates a low pass filter.

The upper channel of FIG. 1 which includes the component blocks 1, 2, 4, 5 and 6 comprises a reference signal channel. The middle channel, which includes the component boxes 3, 4, 5, 6, 7 and 8, comprises an information signal channel, $CH_1$. The lower channel, $CH_n$, which includes block components corresponding to those in the middle channel is intended to show that the invention may also include more than one information signal channel if desired. Each information signal channel cooperates with the reference channel during operation.

FIG. 2 is a graphic representation of voltage and current waveforms in which the letters *a–h* indicate the waveforms at corresponding points in the circuit of FIG. 1. Various waveforms are shown as triangular in shape in FIG. 2 rather than sinusoidal for the sake of simplicity.

During operation the oscillator 1 produces constant frequency oscillations as illustrated by the waveform *b* in FIG. 2. These oscillations are subjected to a predetermined phase shift by the phase shifting device or circuit 2 to produce the reference signal waveform *c* shown in FIG. 2, which is recorded on one track of the recording medium, not shown, and which is a part of the recording and reproducing apparatus 4 in FIG. 1.

In order to record and reproduce information signals of positive and negative polarities, as is the case with most of the recording and reproducing purposes, the amount of the predetermined phase shift should be about ninety degrees. This is because the pulse width of the pulse width modulated signal later described may become, for example, short when the information signal to be recorded is of negative polarity while broad if of positive polarity. On purpose for recording and reproducing information signals of only one polarity, such predetermined phase shift may be zero degree.

The output of the oscillator 1 is also fed to the modulator 3 where it is phase modulated by an information signal 2*a* to be recorded, which is, of course, also applied to the phase modulator 3. The modulated output signal 2*d* from the phase modulator 3 is recorded simultaneously with the reference signal 2*c*, but on an information signal recording track which is separate from the reference signal track on the recording tape or medium.

In order to reproduce the original signal 2*a*, both the reference signal 2*c* and the phase modulated signal 2*d* are fed from well known suitable pick-up heads, not shown, in the recording and reproducing apparatus 4, to separate amplifiers 5 and separate squaring circuits 6 in the reference signal channel and in the information signal channel. In the squaring circuits 6 both the reference signal and the phase modulated information signal are converted to square waves having constant amplitudes; the reference signal from the reference signal channel squaring circuit is illustrated by the waveform 2*e*, and the phase modulated information signal from the reproducing channel squaring circuit is illustrated by the waveform 2*f*. These signals or waveforms 2*e* and 2*f* are then both fed to the "AND" gate 7 where they are converted to a pulse width modulated signal in the output thereof, this output signal being shown as the waveform 2*g*. This signal 2*g* is then fed to the low pass filter 8, which eliminates the high frequency components from this signal to produce a reproduced information signal as shown by the waveform 2*h*, which is a facsimile of the original information signal 2*a*.

The operation has been described above for a case where only one information signal was recorded and reproduced, however, any number of information signals can be simultaneously recorded and reproduced by providing a separate channel $CH_n$, see FIG. 1, for each other information signal.

It will be noted that in accordance with the invention, recording and reproduction of an information signal is achieved with the aid of an unmodulated reference signal which is also recorded simultaneously with the information signal to be recorded. This, however, requires the provision of one extra track for this system compared with conventional magnetic recording and reproducing systems. Although this may at first consideration seem to be a disadvantage, this is not the case since generally speaking, magnetic recording and reproducing systems for data measurement are designed primarily to record numerous kinds of data and to reproduce such data simultaneously, with the result that a number of tracks are ordinarily required anyway, and one of these tracks may be utilized as the reference signal track. Under these circumstances the provision of only one extra track to serve as the reference signal track can hardly be considered a disadvantage of any importance.

Moreover, with magnetic recording and reproducing apparatus for data measurement, it is common practice to employ an extra track for recording and reproduction of an announcing or timing signal in addition to the plurality of data tracks employed. Accordingly, it is possible to record the reference signal and the announcing or timing signal on a single track by means such as for example, superposition or modulation, and to separate these signals from one another during reproduction. By utilizing this latter technique the number of tracks would remain the same as that required with conventional systems, and thus no extra track would be necessary for the reference signal.

The system according to this invention has a number of advantages over the various conventional systems. For example, although in the system of the invention the carrier center frequency stability is of approximately the same order as that obtainable with the pulse width modulation system, it is far superior to the frequency modulation system in that a constant frequency oscillator can be employed for the reference signal.

An additional advantage of the system of this invention lies in the width of the frequency band within which recording and reproduction can be performed. Because recording and reproduction of pulse wave forms is not necessary in the present system as in the frequency modulation system, the useable frequency bandwidth is of the same order as that for the frequency modulation system. Also, for the same recording medium or tape speed, the system of this invention provides recording and reproduction over a frequency band several times as large as that obtainable with the pulse width modulation system.

Finally, the effect due to changes in the speed of the magnetic recording medium between recording and reproduction or playback will be considered. With the system of this invention the phase difference between the reference signal and the phase modulated signal is detected during reproduction, to thereby obtain a reproduced output signal. Accordingly, the degree of occurrence of an undesirable or unwanted output signal component is of the same order as that for the pulse width modulation system. However, such unwanted output signal component for this system is smaller than that for the frequency modulation system, as will be readily apparent from the description above.

From the foregoing it will be appreciated that in the system according to this invention recording and reproduction equipment for data measurement is provided in which the advantages of conventional systems have been retained while the disadvantages thereof have been eliminated. Furthermore, relatively simple construction techniques can also be employed and accordingly this invention also has the advantage of extremely practical utility.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A magnetic recording and reproducing system comprising a reference signal channel and an information signal channel, an oscillator in said reference channel for producing oscillations, a phase shifting device in said reference channel for shifting the phase of oscillations from said oscillator to thereby provide a reference signal, a phase modulator in said information channel to receive oscillations from said oscillator and also an information signal to thereby produce an information modulated signal, signal recording means common to both of said channels, said signal recording means including means for recording said reference signal and said information modulated signal on separate tracks of a recording medium, signal reproducing means common to both of said channels and associated with said recording means for reproducing said reference signal and said information modulated signal, means in said reference channel for converting said reproduced reference signal into square waves, means in said information channel for converting said reproduced information modulated signal into square waves, an AND gate for receiving said square waves from each of said channels to produce a signal in the output thereof when said square waves are simultaneously applied thereto, and means for removing relatively high frequency components from the signal from said AND gate to thereby produce an output signal which is a facsimile of said information signal.

2. The invention described in claim 1 wherein said means in each of said channels for converting said signals to square waves further includes means for maintaining the square waves at a given amplitude.

3. The invention described in claim 1 wherein said means for removing relatively high frequency components comprises a low pass filter.

4. The invention described in claim 1 which further includes an amplifier in said reference channel for amplifying said reproduced reference signal and an amplifier in said information channel for amplifying said reproduced information modulated signal.

No references cited.

BERNARD KONICK, *Primary Examiner.*

T. W. FEARS, *Assistant Examiner.*